United States Patent [19]

Pedersen

[11] Patent Number: 5,656,225
[45] Date of Patent: Aug. 12, 1997

[54] METHOD OF PRODUCING A CONTAINER OF ORIENTABLE PLASTIC MATERIAL

[75] Inventor: Jan Rune Pedersen, Odense, Denmark

[73] Assignee: PLM AB, Malmo, Sweden

[21] Appl. No.: 459,239

[22] Filed: Jun. 2, 1995

Related U.S. Application Data

[62] Division of Ser. No. 133,149, filed as PCT/SE92/00196, Mar. 30, 1992.

[30] Foreign Application Priority Data

Apr. 11, 1991 [SE] Sweden ............................ 9101104

[51] Int. Cl.$^6$ ............................ B29C 55/22; B29C 61/02
[52] U.S. Cl. ............................ 264/230; 264/292; 264/323; 264/345
[58] Field of Search ............................ 264/230, 234, 264/235, 292, 323, 345, 346

[56] References Cited

U.S. PATENT DOCUMENTS 4,595,550  6/1986  Jakobsen et al. ............................ 264/292

*Primary Examiner*—Leo B. Tentoni
*Attorney, Agent, or Firm*—Keck, Mahin & Cate

[57] ABSTRACT

A method for producing a squeezable, thin-walled tube container of orientable plastic material in which the container includes a mouth portion, a squeezable thin-walled tubular container body having an open bottom-forming portion and a connecting portion located between the mouth portion and the container body and in which the mouth portion and the connecting portion consists of non-oriented material includes forcing the non-oriented material in the tube portion, by mechanical means, through a gap with a gap width at most amounting to approximately half the wall thickness of the material in the tube portion for orientation of the material passing through the gap, thereby obtaining substantially monoaxial orientation of the material which forms the container body and the open bottom-forming portion of the thin-walled squeezable tube container. The material is heated after passage through the gap and maintained at a temperature at which the material undergoes thermal crystallization and/or shrinking in the orientation direction of the material.

10 Claims, 4 Drawing Sheets

METHOD OF PRODUCING A CONTAINER OF ORIENTABLE PLASTIC MATERIAL

This is a divisional of application Ser. No. 08/133,149, filed as PCT/SE92/00196, Mar. 30, 1992.

FIELD OF THE INVENTION

The present invention relates to a method of producing a container.

BACKGROUND OF THE INVENTION

In many contexts, there is a need for a thin-walled container of plastic material, in which the container, at least in its thin-walled portion, consists of oriented material. The desire that the thin-walled material be oriented is conditioned by the fact that the material will thereby generally possess superior mechanical strength properties than the non-oriented material. Naturally, the property of being thin-walled affords the obvious advantage that the material quantity in the container is reduced, and thereby the material costs of the container. It is normally a wish in this art that the mouth portion of the container consists of thicker material, in particular in practical versions in which the container is intended to be emptied of its contents in portions. As a result of the thicker material, the mechanical properties of the mouth portion will be improved (the mouth portion becomes more stable), and handling of the container is generally facilitated in connection with its opening and/or its reseating. One example of a container in which the above-outlined objects exist is a tube for mustard, fish paste, caviar etc. A container designed as a tube and employed for the above-mentioned objects must also be easy to compress in order to facilitate the forcible discharge of the contents of the container.

Injection moulding of a container of the type disclosed in the preceding paragraph is extremely difficult, since the material fed to the mould cavity is forced to pass through a narrow gap-like aperture in order to be displaced to the parts of the mould located most distally from the injection nozzle. This places extreme demands on temperature control of the molten, injected plastic material, as well as on the properties of the plastic material itself, As a result, containers produced in accordance with the technique described in this paragraph will be of undesirably large wall thickness.

SUMMARY OF THE INVENTION

Employment of the present invention will eliminate the problems inherent in displacing molten plastic material through narrow passages, at the same time as the present invention makes it possible to obtain extremely thin wall portions in the container body. Moreover, the sought-for oriented material in the container body will be obtained, whereby the combination of great mechanical strength and resilience will be achieved.

Further expedient embodiments of the present invention are disclosed in the appended subclaims.

BRIEF DESCRIPTION OF THE DRAWINGS

The present invention will be described in greater detail hereinbelow with particular reference to the accompanying Drawings. In the accompanying Drawings.

DETAILED DESCRIPTION OF THE PREFERRED EMBODIMENTS

Figure 1:
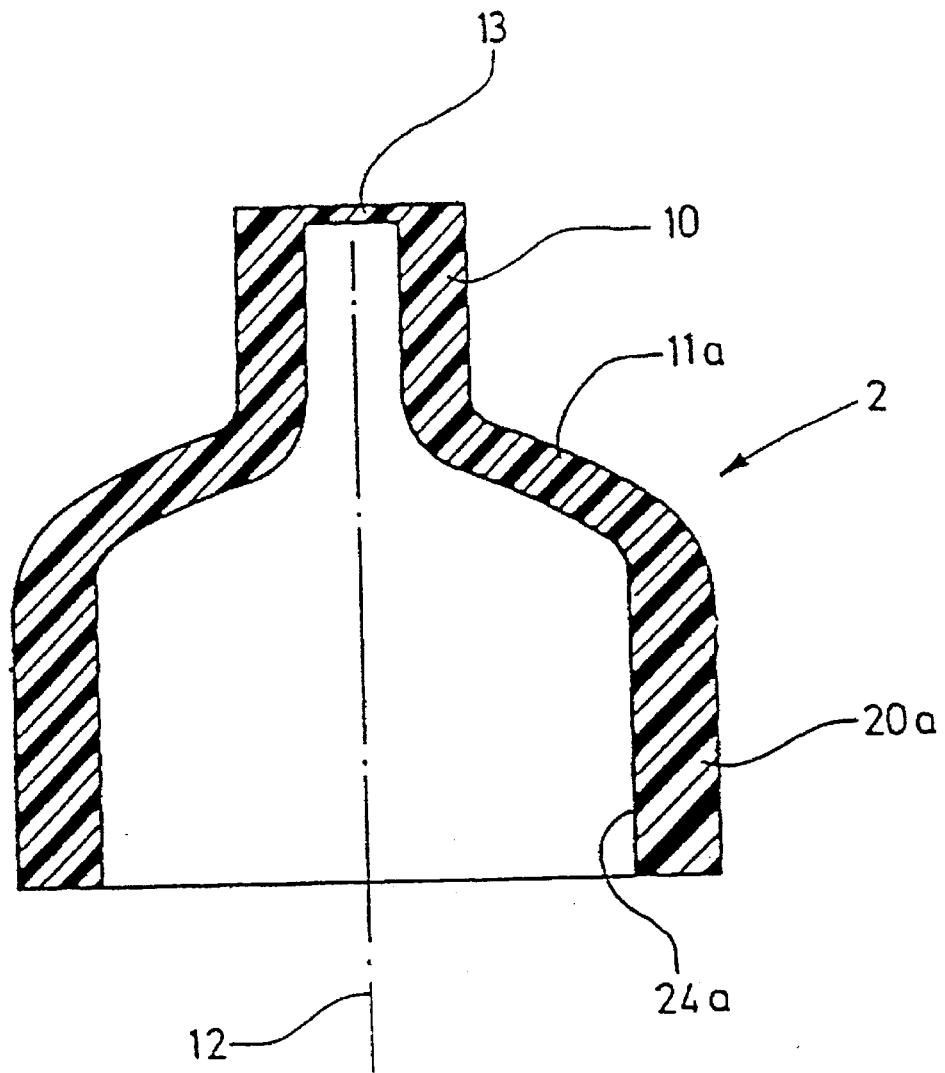
FIG. 1 is a cross-section through a blank from which a container is produced.

FIG. 1 shows a blank 2 of non-oriented (amorphous) plastic material. The blank comprises a mouth portion 10, a tube-like portion 20a and a material region 11a in which the mouth portion merges into the tube-like portion. The mouth portion is sealed by means of a material disk 13 formed in connection with the injection moulding of the blank and constituting a material portion integral with the adjacent plastic material. As a rule, the material disk 13 corresponds to that material region in which the plastic material is fed to the injection mould in connection with production of the blank. As a result, the material disk is of more irregular configuration than that which is apparent from the Figures. Reference numeral 12 indicates a centre axis of the blank. The tube-like portion 20a has an orientation which substantially corresponds to the axial direction of the centre axis. The cross-section of the tube-like portion is, for example, circular, but the inventive concept as herein disclosed also permits employment of a blank whose cross-section may have any optional configuration, for example polygonal, oval etc.

Figure 2:
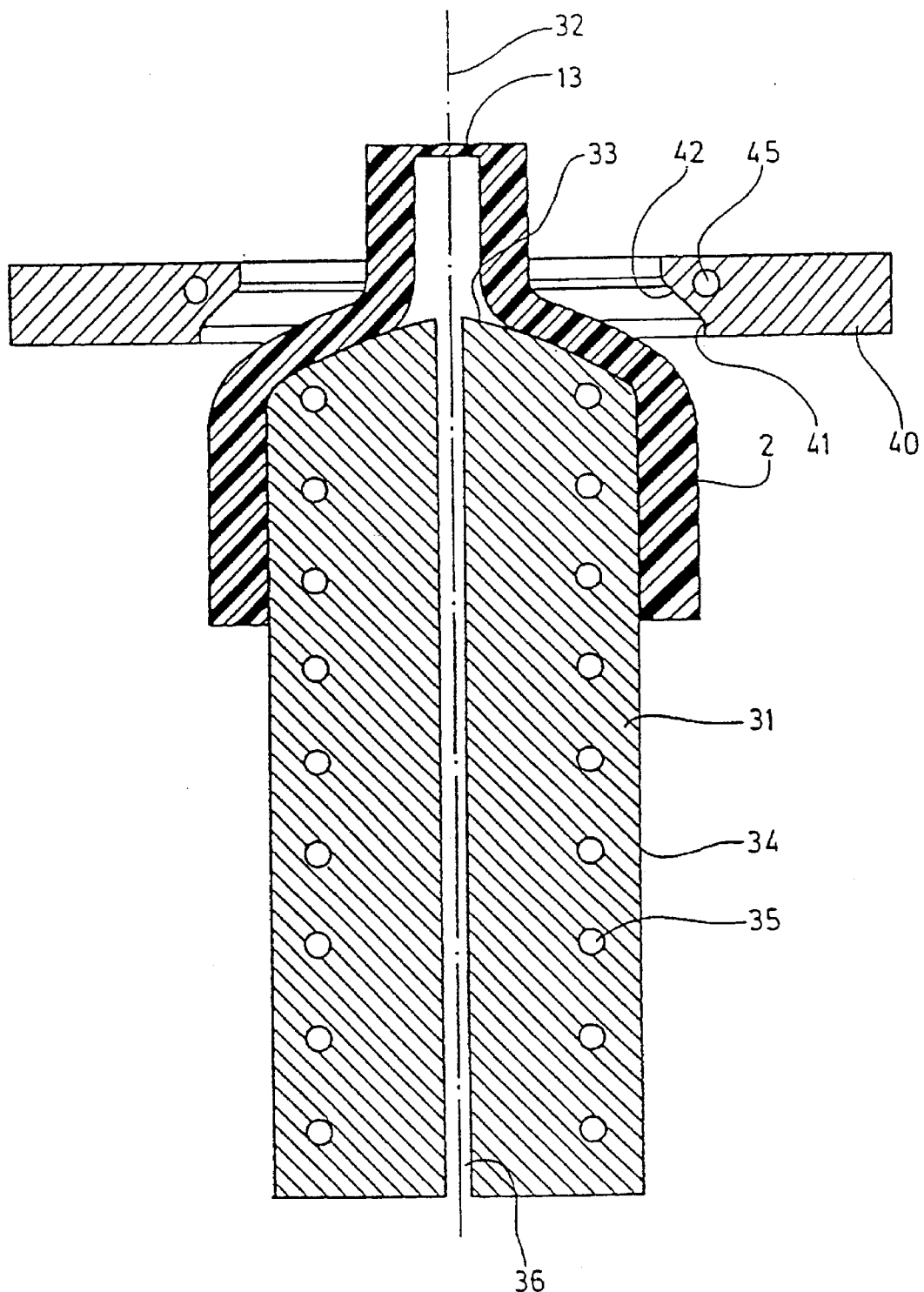
FIG. 2 is a cross-section through a schematically illustrated apparatus for reforming the blank into the container.

FIG. 2 shows the blank 2 placed on a mandrel 31. The mandrel has an abutment surface 33 which is upwardly facing in the Figure, and an outer defining surface 34 disposed parallel with its centre axis 32. The cross-section of the mandrel and the dimensions of the mandrel are adapted to the cross-section of the blank and the dimensions of the blank so that the outer defining surface 34 abuts against or is located close to the inner defining surface 24a of the blank. The mandrel is provided with channels 35 for thermal medium, whereby the temperature of the mandrel may be adjusted. The mandrel is provided with a central channel 36 which discharges in the upwardly facing abutment surface and, as a rule, in its central region. The central channel is connected to means (not shown) for supplying compressed air to the channel.

Figure 4:
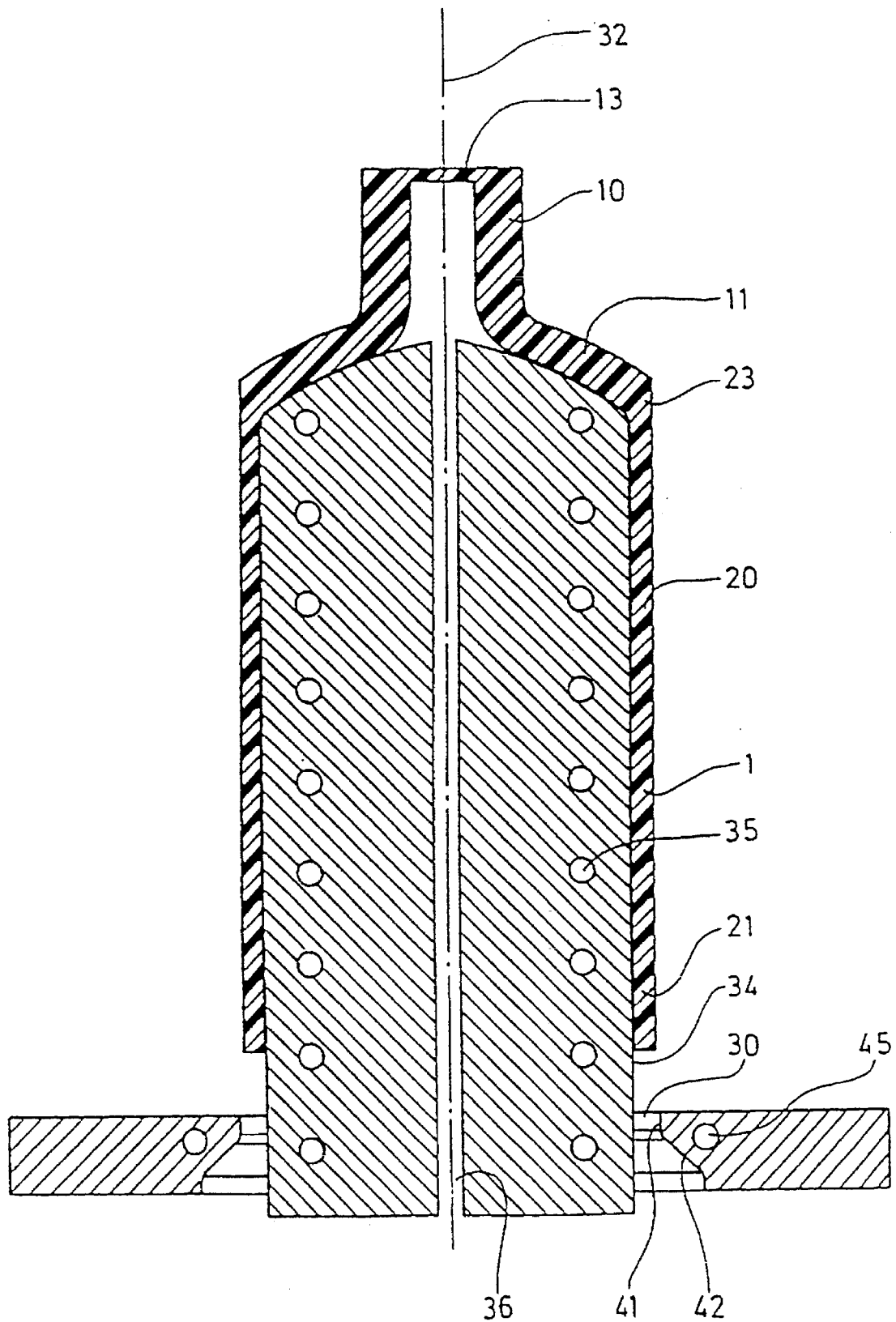
FIG. 4 is a cross-section corresponding to the cross-section of FIG. 2, in which the container has been formed.

FIG. 2 also shows a mechanical device 40, hereinafter designated drawing ring, which is shown in the Figures in a position above the blank 2. The drawing ring is also provided with channels 45 for thermal medium. The drawing ring and the mandrel are connected to means (not shown in the Drawing) for relative displacement of the drawing ring and the mandrel. In the relative displacement, the drawing ring passes along the mandrel and in such instance forms, between itself and the mandrel, a gap 30 (c.f. FIG. 4). This is dimensioned so as to have a gap width which is less than the material thickness of the blank and which, as a rule, amounts at most to half of the material thickness of the blank in the tube-like portion of the blank. The defining surface 41 of the drawing ring facing the mandrel includes an oblique surface 42, hereinafter also designated working surface.

Figure 3:
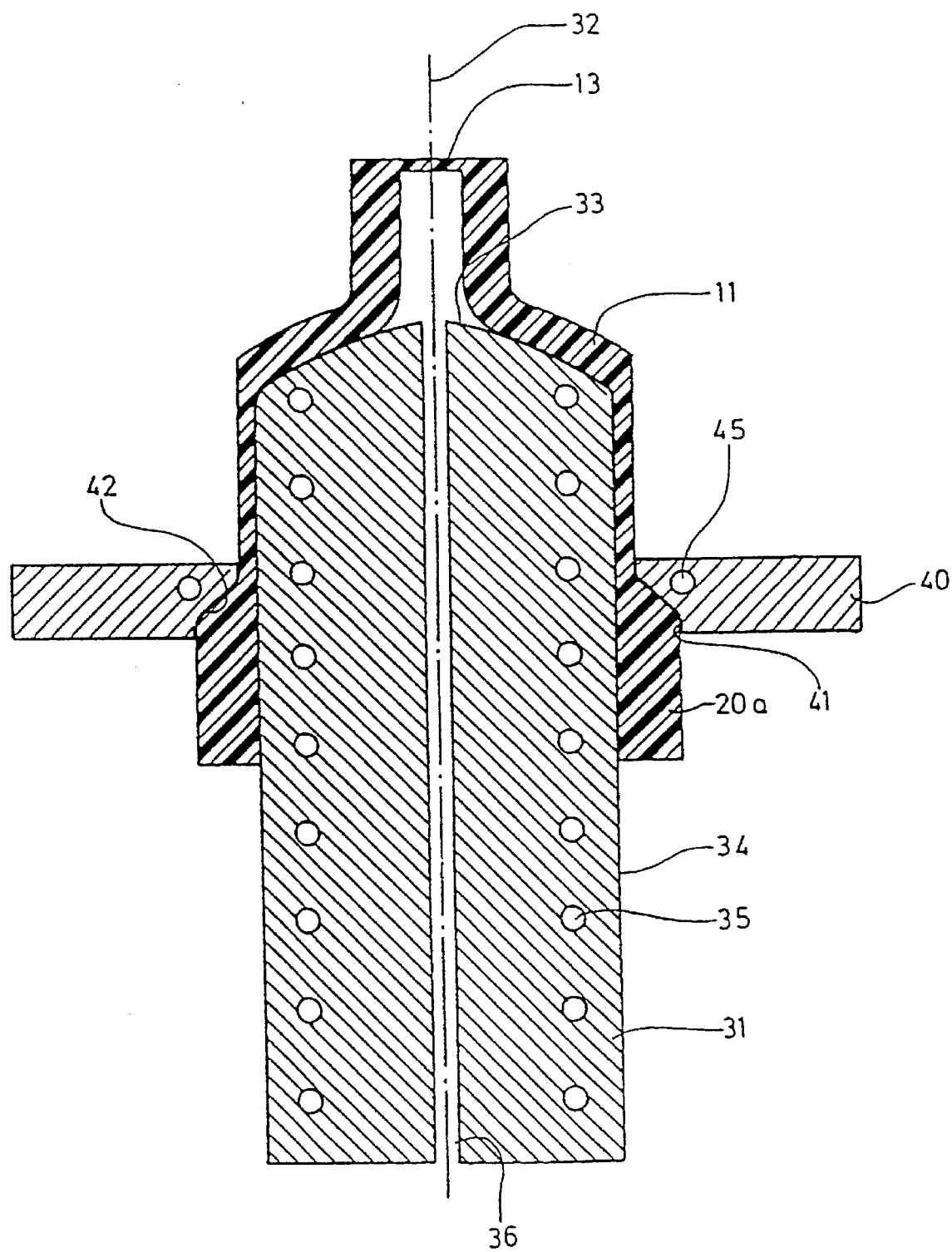
FIG. 3 is a cross-section corresponding to the cross-section of FIG. 2 in which the reforming of the blank into the container has been commenced.

FIGS. 3 and 4 show the drawing ring in positions along the mandrel 31. In the position illustrated in FIG. 3, the drawing ring has reduced the material thickness of the tube-like portion 20a of the blank along a portion thereof, and in FIG. 3, the drawing ring has reached a position where all material in the tube-like portion has passed through that gap which the drawing ring forms to the mandrel during the relative displacement of the drawing ring along the mandrel.

FIG. 4 shows a container 1 formed from the blank and comprising a mouth portion 10, a container body 20, a connecting portion 11 between the mouth portion and the container body, as well as the bottom portion 21 of the container. The container body consists of material which, on displacement of the drawing ring in relation to the mandrel has passed through the gap 30 between the drawing ring and the mandrel. On passage, the material thickness has been reduced and the material obtained a monoaxial orientation. In certain materials, for example PET, deformation of the material takes place corresponding to that deformation which the material would obtain if the material, under corresponding conditions (temperature and speed of displacement through the gap) had been subjected to monoaxial stretching forces so that material flow occurred. By the orientation, a crystallinity in the material will be achieved of at least 12%, and often of at least 17%.

In certain practical applications, production of the container is completed by the material in the wall of the container body being heated, by the mandrel 31, or after the container under formation has been moved to yet another mandrel (not shown on the Drawings but of corresponding design and construction to that shown in FIGS. 2–4), to a temperature at which the material thermocrystallizes. In such instance, the material is retained on the mandrel for a predetermined period of time which is adapted to the special effects it is intended to achieve, for example in the form of release of inner tensions embodied in the material on orientation, shrinking of the material in the orientation direction so as to reduce the shrink tendency of the material on heating, increase of crystallinity so as to improve mechanical strength properties, etc. By this heat treatment, the desired increased crystallinity of the material will be satisfied in addition to the crystallinity obtained by the orientation process. It is thereby possible, in certain practical applications, to obtain a crystallinity of at least 17% and even of at least 25% even when the crystallinity conditioned by the monoaxial orientation is less than 15%.

On passage through the gap 30, a distinct transition 23 is formed between non-oriented material and oriented material. Such is also the case in the starting region of the orientation of the material, i.e. in that region where the connection portion 11 merges into the container body 20. The distinct transition 23 has an extent in the direction of orientation of the material which at most amounts to twice the material thickness. Preferably, the extent of the transition 23 at most amounts to 1.5 times the material thickness and, as a rule, at most to the material thickness proper of the non-oriented material which is located immediately adjacent the transition 23. Material which passes through the gap 30 will obtain, in addition to the above-indicated substantially monoaxial orientation, also a corresponding material thickness.

The above detailed description has referred to but a limited number of embodiments of the present invention, but it will readily be perceived by a person skilled in the art that the present invention encompasses a large number of embodiments without departing from the spirit and scope of the appended claims.

I claim:

1. A method for producing a squeezable, thin-walled tube container of orientable plastic material, in which said container comprises a mouth portion, a squeezable, thin-walled, tubular container body having an open bottom-forming portion, and a connecting portion located between said mouth portion and said container body, and in which said mouth portion and said connecting portion consist of non-oriented material;

wherein said method comprises the following steps:
forming a blank of substantially amorphous material comprising a mouth portion and a material region corresponding to said connecting portion of said container being formed;
forming both said mouth portion and said material region of said blank with a shape substantially corresponding to a shape of corresponding parts of a completed container;
forming in said blank a tube portion connected to said material region, said tube portion being of substantially non-oriented material and with a geometric orientation substantially corresponding to an axial direction of said blank;
forcing said substantially non-oriented material in said tube portion, by mechanical means, through a mechanical gap with a gap width at most amounting to approximately half the wall thickness of said material in said tube portion, for orientation of said material of said tube portion;
forming said container by orienting said material on passage through the gap, thereby obtaining substantially monoaxial orientation of all said material which, having passed through the gap, forms said container body and said open bottom-forming portion of the thin-walled tube container; and
heating said material after passage through said gap and maintaining said heated material at a temperature at which said material undergoes at least one step selected from the group consisting of crystallizing thermally and shrinking in said orientation direction of said material.

2. A method as claimed in claim 1, comprising forming said container with a distinct transition between non-oriented and oriented material, said transition having an extent in a longitudinal direction of said container which at most amounts to twice said material thickness of said non-oriented material immediately adjacent the transition.

3. A method as claimed in claim 1, wherein all material in said container body and said bottom portion is oriented.

4. A method as claimed in claim 1, wherein said oriented material, in addition to crystallinity conditioned by orientation is given a thermally conditioned crystallinity.

5. A method as claimed in claim 1, wherein said material is PET and crystallinity of said oriented material is at least 15%.

6. A method as claimed in claim 1, wherein all the oriented material is substantially of the same material thickness.

7. A method as claimed in claim 2, wherein the transition has an extent in the longitudinal direction of said container which at most amounts to 1.5 times said material thickness of said non-oriented material immediately adjacent the transition.

8. A method as claimed in claim 2, wherein the transition has an extent in the longitudinal direction of said container which at most amounts to said material thickness of said non-oriented material immediately adjacent the transition.

9. A method as claimed in claim 5, wherein said material is PET and crystallinity of said oriented material is at least 20%.

10. A method as claimed in claim 5, wherein said material is PET and crystallinity of said oriented material is at least 25%.

* * * * *